United States Patent [19]

Finance

[11] 4,278,219

[45] Jul. 14, 1981

[54] DEVICE FOR DETECTING HARD LANDINGS

[75] Inventor: Robert J. Finance, Toulouse, France

[73] Assignee: Etat Francais represented by the Delegue General pour l'Armement, Paris, France

[21] Appl. No.: 11,543

[22] Filed: Feb. 12, 1979

[30] Foreign Application Priority Data

Feb. 20, 1978 [FR] France ............................... 78 04675

[51] Int. Cl.³ ....................... B64C 25/00; G01P 15/04
[52] U.S. Cl. ............................ 244/100 R; 73/517 R; 73/492; 116/203; 244/129.1
[58] Field of Search ................. 244/100 R, 1 R, 129.1; 73/514, 492, 517 R; 200/61.45 M; 116/203

[56] References Cited

U.S. PATENT DOCUMENTS

| 1,588,767 | 6/1926 | McGrath | 73/514 |
| 2,747,041 | 5/1956 | Thomson | 73/492 |
| 2,846,207 | 8/1958 | Marggraf | 73/517 R |
| 3,712,122 | 1/1973 | Harris et al. | 73/492 |
| 4,103,640 | 8/1978 | Feder | 73/492 |

Primary Examiner—Charles E. Frankfort
Attorney, Agent, or Firm—Stevens, Davis, Miller & Mosher

[57] ABSTRACT

A device for detecting a hard landing of an aircraft. The aircraft is equipped with a detector for determining the vertical acceleration produced by the impact of the airplane with the ground. The device is equipped with a threshold trigger for indicating when acceleration exceeds a predetermined level corresponding to a hard landing.

7 Claims, 5 Drawing Figures

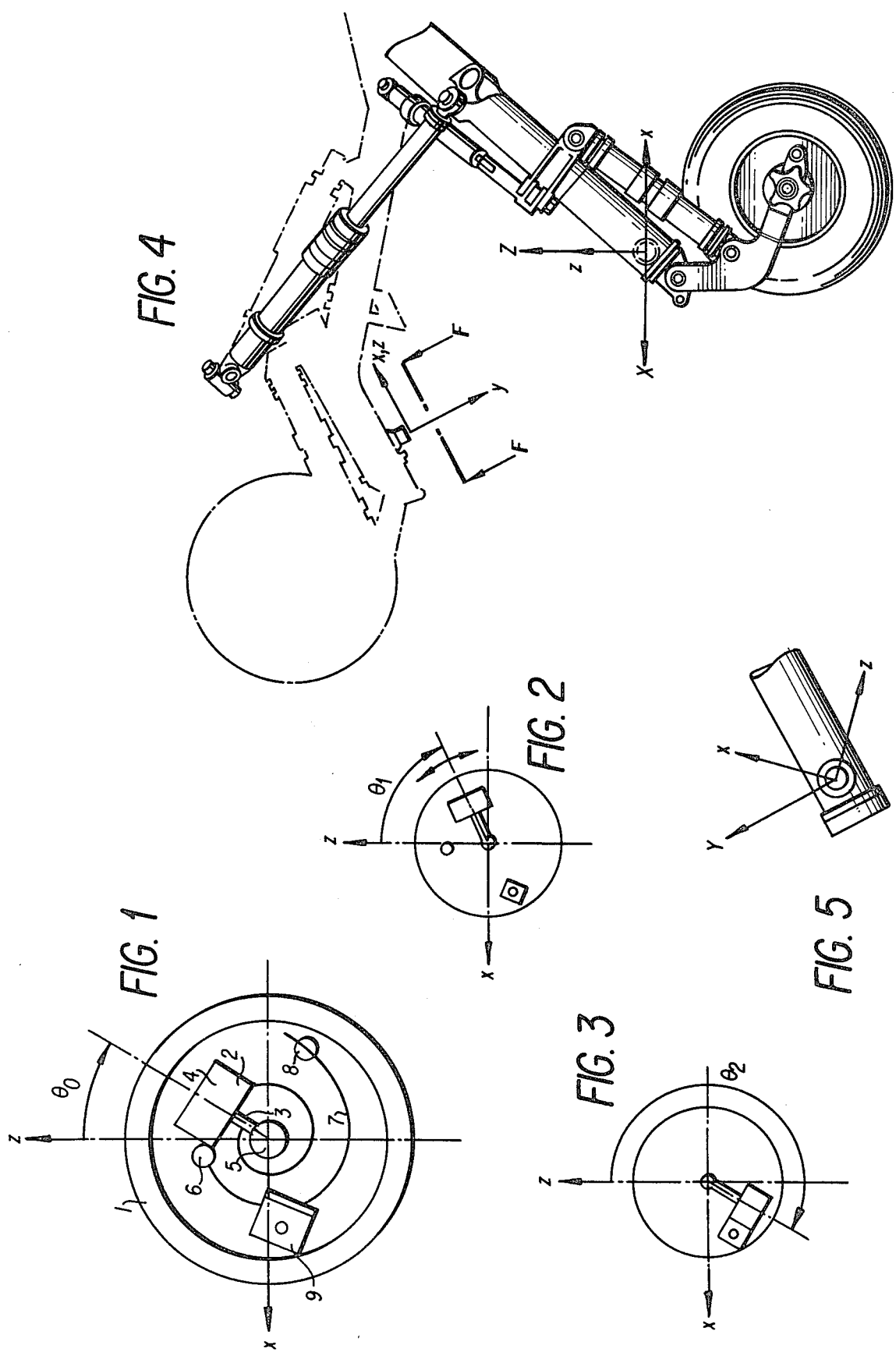

DEVICE FOR DETECTING HARD LANDINGS

BACKGROUND OF INVENTION

This invention relates to systems which permit detecting and signalling "hard" landings of aircraft, landings which due to a violent impact, may cause immediate damage to the airplane, or landings of lesser intensity which if repeated, may damage the structure of the plane resulting in breaks in the landing gear or of the air frame on the ground or in flight.

Devices for detecting abnormal landings have been previously proposed. These devices are based on various principles.

There is a known device which determines the depression of the shock absorbers of the main landing gears on an airplane consisting of for example an indicator of lead which will be marked by the arrival of the shock absorber at the end of its stroke.

This system is not reliable, since it is known that it is possible to effect a hard landing without the shock absorber reaching the end of its stroke. This can occur upon the takeoff of the airplane with the system indicating an erroneous measurement.

A second known device makes it possible to note an excessive increase in pressure in the shock absorbers of the landing gear. The pressure of the hydraulic liquid of the shock absorber is a function of the internal force within the shock absorber, which is related to the vertical force which the airplane experiences.

This system requires substantial changes to the shock absorber making this device expensive. Furthermore, this system is frequently inaccessible, particularly when the shock absorbers are integrated in the landing gear leg.

Another known device employs a piezoelectric accelerometer which becomes active only when the landing gear is extended.

This device has the drawback of detecting all accelerations which occur when the landing gear is out, whatever the cause thereof, which is very disturbing in the case of combat airplanes which experience substantial vertical acceleration in the "landing gear out" configuration which the detector will indicate in the same manner as those coming from a hard landing.

Finally, it has been suggested to use a purely physiological detection on the part of the pilot, who feels a strong acceleration and can report it.

This last-mentioned solution is ineffective since the impact at the time of the landing is very brief and furthermore it is filtered by the seat and by the body of the pilot, who is therefore incapable of quantifying the received acceleration.

SUMMARY OF INVENTION

The object of the present invention is to overcome the above-mentioned drawbacks by providing a simple, reliable device which makes it possible to detect hard landings, whether symmetrical or asymmetrical.

The object of the present invention, therefore, is to provide a device for detecting hard landings of aircraft, characterized by the fact that it comprises, in combination with a memory means, means for detecting the vertical component of the acceleration produced by the impact of an airplane with the ground at the time of landing and having a trigger threshold, said means being formed of a torsion pendulum which comprises a pendulum arm having a weight at one of its ends, the remaining end being fastened to the aircraft by means of a swivel pin and an elastic means providing the trigger threshold for the detection means.

The invention accurately detects hard landings while being insensitive to parasitic stresses such as accelerations due to turns, maneuvers, or to gusts of wind in flight, or other accelerations due to braking, turns or oscillations resulting from taxiing.

A second aspect of the invention is that it provides a device of minimum weight which can be mounted in a simple manner on all types of airplanes and which permits a rapid reading of the detected result.

The invention will be better understood from the following description and the accompanying drawings, which illustrate one specific embodiment, given by way of illustration and not of limitation.

DESCRIPTION OF THE DRAWINGS

FIG. 1 shows a basic diagram of a detector in accordance with the invention, it being shown in its position of rest.

FIG. 2 shows the detector in an intermediate position.

FIG. 3 shows the detector in a position in which a hard landing has been detected.

FIG. 4 indicates the arrangement of a detector on the landing gear of an airplane, in this particular case a combat plane.

FIG. 5 is a view along the line F of a part of FIG. 4.

DESCRIPTION OF THE PREFERRED EMBODIMENT

The orthogonal axes X, Y, Z in the figures designates the references of the airplane in which X indicates the forward direction of the airplane, Y its lateral direction, and Z the vertical direction of the airplane.

The axes x, y, z gives the reference data of the detection device.

Referring now to FIG. 1, the device in accordance with the invention is essentially formed from a housing 1 within which there is a torsion pendulum 2 comprising a pendulum arm 3 having a weight 4 at one of its ends, its other end being connected to the housing by means of a pin 5 which permits its rotation within the housing and is combined with elastic means.

In its position of rest, the pendulum 2 rests against a first rest-position stop 6 and the longitudinal axis of the pendulum forms an angle of $\theta_0$ with the vertical z axis of the device.

In the absence of stresses, the pendulum 2 is held against the stop 6 by means of a spiral spring 7, which creates an initial stressing of the pendulum 2, one end of which is fastened to a stud 8 mounted on the bottom of the housing 1, its other end being rigidly connected to the pendulum arm 3.

The device is fastened to the landing gear of the aircraft in such a manner that when the landing gear is out the rotation of the pendulum arm 3 takes place in a plane substantially parallel to the plane of symmetry of the aircraft (FIG. 4). Thus positioned, the device is sensitive to the vertical component of the acceleration produced by the impact of the aircraft on the ground at the time of landing. Furthermore, the initial motion thereof is facilitated by the brief longitudinal deceleration which takes place upon the start of the landing.

The device makes use of the angular movement of the pendulum, whose rotation is a function of the acceleration to which it is subjected.

During detection, that is to say when the landing gear is out, the device is subjected to parasitic stresses such as acceleration due to turning in flight, the intensities of which are less than those of a hard landing.

The pendulum thus leaves its position of rest $\theta_0$ and it oscillates around an intermediate position $\theta_1$ (on the order of 30° from $\theta_0$ for a "landing gear out" maneuver) since the action produces insufficient force to overcome the return force of the spiral spring 7, the stiffness of which has been determined experimentally and corresponds to the force produced by the acceleration of a hard landing.

The spiral spring 7 therefore creates a trigger threshold for the device such that, when the threshold is not reached, the pendulum is maintained against its position of rest $\theta_0$. Thus, the device is free from parasitic stresses having an intensity less than that of a hard landing.

When the device is subjected to a vertical acceleration equal to that of a hard landing (see FIG. 3), for instance equal to 3 g (in which g represents the acceleration of gravity) in the case of a combat airplane, the pendulum 2 is subjected to a force greater than the return force of the spring 7. It then leaves its position of rest and moves until it reaches a position $\theta_2$ which may be about 180° in the case of a combat airplane.

This position $\theta_2$ is stored, for instance, by means of a magnet 9 which attracts the weight 4 as soon as the pendulum 2 has reached the position $\theta_2$ corresponding to a hard landing.

In this way, the position of the pendulum is retained and can be visualized by means of an indicator located on the outside of the housing 1 and operating as soon as the magnet 9 retains the pendulum 2.

This special means of storing the position $\theta_2$ can be replaced by a mechanical means without thereby going beyond the scope of the invention.

In order to prevent the device from recording parasitic phenomena during flight, it is advantageously arranged in such a manner that when the landing gear is retracted the device is insensitive to vertical accelerations. This can be achieved by placing the device, during flight, in a plane substantially perpendicular to the plane of symmetry of the aircraft whereby the axis of rotation 5 of the pendulum arm 3 is located substantially vertically, as shown in FIGS. 4 and 5.

The device in accordance with the invention can be applied to long, short, or even vertical landing type aircraft.

What is claimed is:

1. A device mounted on an aircraft landing gear for detecting hard landings of the aircraft, comprising detection means for indicating a hard landing and memorization means for storing a detected indication of a hard landing, whereby the detection means determines that an excessive vertical acceleration has been produced by the impact of the aircraft on the ground at the time of landing and is formed of a torsion pendulum comprising a rotary pendulum arm having a weight at one of its ends, its other end being attached to the aircraft landing gear by means of a swivel pin, and elastic means cooperating with the pendulum arm to produce a calibrated trigger threshold for the device, whereby said pendulum arm is biased by paid elastic means to a first position until a predetermined acceleration is effected, said pendulum arm then pivoting about said swivel pin in response to said predetermined acceleration, and whereby said memorization means retains said pendulum arm in a second position when a hard landing occurs.

2. A device for detecting hard landings according to claim 1, characterized by the fact that during detection, the aircraft landing gear is extended for use whereby the movement of rotation of the pendulum arm is located in a plane substantially parallel to the plane of symmetry of the aircraft thus permitting rotation of said pendulum arm.

3. A device for detecting hard landings according to claim 2, whereby the elastic means for producing the calibrated trigger threshold consists of a spiral spring having a portion rigidly connected to the pendulum arm and another portion rigidly connected to a housing.

4. A device for detecting hard landings according to claim 3 comprising a stop member, against which member the pendulum arm is urged by the aforementioned spiral spring.

5. A device for the detection of hard landings according to any of claims 1 to 4, characterized by the fact that when the aircraft landing gear is in a retracted stored position, the pendulum arm is located in a plane substantially perpendicular to the plane of symmetry of the aircraft, the axis of rotation of the pendulum arm being located substantially vertical whereby the device is inactivated.

6. A mechanical landing detection device for hard landings according to claim 5, wherein the memorization of the detection is obtained by a mechanical device which immobilizes the weight when it is moved through an angle corresponding to a hard landing.

7. A device for detecting hard landings for an aircraft comprising:

detection means for determining the vertical acceleration produced by the impact of the aircraft on the ground during landing comprising a torsional pendulum having a rotary pendulum arm with a weight at one end, the remaining end of said arm being attached by means of a swivel pin to a landing gear of said aircraft, an elastic means cooperating with the pendulum arm to maintain said pendulum arm in a rest position until a threshold acceleration is detected;

said pendulum arm being connected to said landing gear of said aircraft whereby said pendulum arm rotary movement is located in a plane substantially parallel to the plane of symmetry of the aircraft when said aircraft landing gear is in an extend use position, thus permitting rotation of said pendulum arm, and said pendulum arm rotary movement is located in a plane substantially perpendicular to the plane of symmetry of said aircraft when said landing gear is in a retracted non-use position, thus immobilizing said pendulum arm from moving; and memorization means for storing a detected indication that said pendulum arm has moved to a position indicating a hard landing.

* * * * *